Patented Dec. 4, 1945

2,390,354

UNITED STATES PATENT OFFICE 2,390,354

METHOD OF MOLDING GLASS

Charles W. Clapp, Corning, N. Y., assignor to Corning Glass Works, Corning, N. Y., a corporation of New York No Drawing. Application November 6, 1942, Serial No. 464,826

6 Claims. (Cl. 106—47)

This invention relates to methods of molding or shaping glass articles and particularly to the molding of intricate glass shapes the production of which has heretofore been impossible or impracticable because the physical properties of glass place certain limitations on the prior methods.

Ordinary methods of blowing or pressing molten glass are not adapted for making some articles, for example, articles of substantial thickness having small holes or perforations. At the temperatures required for molding molten glass any implement employed for making fine perforations would quickly become red hot and stick to the glass or be burned off. One common method of making such perforations has been to mold wires of desired diameter into glass articles and subsequently to dissolve them by acid attack to leave a hole.

Cold methods of shaping glass such as pressing and slip casting of powdered glass have not been used to any appreciable extent for various reasons. Prior to the invention of Bickford Patent 2,299,374, it was impractical to attempt to slip cast powdered glass due to its non-plastic characteristics. Furthermore, many otherwise stable glasses are subject to excessive solution in water and other common solvents when ground to very fine powders such as are required for the preparation of casting slips. Mechanical molding processes avoid most of the disadvantages of slip casting, but powdered glass is not naturally cohesive and the use of temporary binders is essential to produce adequate green strength to permit handling of the molded shapes prior to firing. It has been observed that the use of temporary binders with powdered glass tends to result in devitrification of the resultant article on firing. It is not known precisely why this phenomenon occurs, but it has been found possible substantially to eliminate the same by practicing the inventions hereinafter set forth. Furthermore, by following these practices the color of the resulting article has been improved and the strength materially increased.

Accordingly, an object of this invention is to provide an improved method of molding shaped glass articles from powdered glass.

Another object of the invention is to provide a method of molding shaped glass articles from powdered glass in a substantially dry state.

A further object of the invention is to utilize dry pressing and extrusion as methods for shaping glass in a powdered state.

A further object is to increase the mechanical strength of molded articles of powdered glass.

Still another object is to fire such articles without causing discoloration or devitrification thereof.

To the above and other ends the invention comprises intermingling the powdered glass with an organic binder and an oxidizing agent preferably in solution, drying the mixture until it is cohesive without being adhesive, that is, until the particles are coherent to one another but not adherent to other objects, molding the mixture under pressure and subsequently drying and firing the molded article in the neighborhood of the softening temperature of the glass to a substantially continuous glassy structure.

In practicing my invention, the glass is pulverized and ground, preferably in a ball mill using silica or porcelain balls until at least about 50% of it will pass through a 200 mesh screen. To the powdered glass is then added an organic binder and an oxidizing agent preferably dissolved in an amount of a suitable solvent sufficient to dampen the glass powder and wet the individual particles thereof.

The concentration and quantity of the binder solution are subject to certain considerations. The larger the quantity of solvent the more efficiently are the binder and oxidizing agent distributed through the batch and the more readily are the individual particles of glass coated therewith. However, the solvent must subsequently be evaporated and a superfluous amount unnecessarily increases the time and expense of drying. In general, an amount of solvent equivalent to about 15 cc. per 100 grams of glass is sufficient.

The amount of binder employed need not be more than sufficient to temporarily bind the particles, say about .5% to 2% by weight of the glass if the glass is to be dry-pressed, or up to 5% if it is to be extruded. More than this amount is not only superfluous but is difficult to eliminate or burn out of the glass on firing the molded article. I have used a variety of organic materials for binders with more or less success, such as sugar, starch, dextrin, gelatin, glycerine, ethylene glycol, cellulose nitrate, cellulose acetate, amyl and butyl alcohols, paraffin, polyethylene glycol, mineral oils, biphenyl, etc., but I have found that gelatin dissolved in water or cellulose nitrate or acetate dissolved in amyl alcohol or other organic solvent are particularly desirable from the standpoint of effective binding action and ease of burning out. If desired, binders having resinous characteristics when dry may have a plasticizer included with them and for this purpose I may use glycerine with gelatin, dibutyl phthalate with cellulose acetate, camphor with cellulose nitrate, etc. Some binders, such as paraffin or polyethylene, may be added advantageously to the powdered glass without a solvent.

The percentage of oxidizing agent employed may amount to twice the percentage of organic binder but should not greatly exceed this because the finished glass will otherwise tend to bubble if subsequently worked in a flame or heated to softness. As examples of oxidizing agents which may be employed, may be mentioned ammonium or alkali metal nitrates or chlorates.

After the binder solution is mixed and thoroughly disseminated throughout the batch, the dampened mixture is preferably screened to break up lumps or to form the batch into granules or small pellets after which it is spread on trays and dried until the percentage of solvent remaining in the batch is just sufficient to cause the powder to cohere when pressed but insufficient to cause it to stick or adhere to the mold or plunger. In this condition the powdered glass appears and feels entirely dry but is definitely coherent when pressed between the fingers. Although the residual moisture or solvent content will depend somewhat upon the kind and amount of binder used, it is critical and will, in the case of water, amount to from .25% to 1.5% by weight of the glass. Less than this will give insufficient coherence on pressing and more than this will cause sticking of the glass powder to the mold or plunger. Extrusion requires greater plasticity in the batch and hence greater amounts of residual solvent. The proper amount may be found by trial.

As a further aid in preventing adhesion of the batch to the mold I have found that certain materials are effective as lubricants, such as dodecylamine, stearic acid and zinc stearate. The former may be dissolved in a solvent compatible with the binder solution or may be incorporated directly into the binder solution. The other two, being water-insoluble powders, are preferably used without solvent by adding them to and mixing them with the screened batch so as to coat the granules. An amount of lubricant equivalent to .25% by weight of the glass is sufficient. Some of the above named binders also have lubricating properties as, for instance, paraffin, polyethylene glycol and mineral oils.

When the batch has been dried to the proper degree, it is pressed in a mold to the desired configuration under a pressure of about two tons per square inch. This results in a highly compact and strongly coherent structure which can be handled without undue breakage. The pressed article is then dried and heated at a temperature near the softening point of the glass, preferably within ±25° to 50° C. of the softening point, until the particles are fused together to form a substantially continuous glassy structure. If the oxidizing agent is omitted from the binder solution, it is difficult to eliminate residual carbon and the final product may be objectionably discolored and seriously crystallized or devitrified. On the other hand, the addition of an alkali metal salt seems to increase the devitrification tendency of some glasses and the use of such salts as oxidizing agents may be objectionable in such cases. Under such circumstances it is advantageous to use ammonium salts as oxidizing agents or to use cellulose nitrate as a binder, the latter being oxidizing per se and requiring no additional oxidizing agent. I have found that when biphenyl is used as a binder it evaporates or is otherwise entirely eliminated on firing the molded article without the necessity of an oxidizing agent being present. Hence, although its binding qualities are not equal to those of gelatin and cellulose nitrate, it is advantageous, with some lead glasses which tend to devitrify on the addition of alkali metal salts, to use biphenyl alone dissolved in acetone or other suitable solvent without any oxidizing agent. With stable glass best results have been obtained by using a binder solution containing .75 part of gelatin and 1.5 parts of potassium nitrate and 14 parts of water per 100 parts of powdered glass.

It is sometimes desirable to modify the size and shape of an article after it has been molded but before it has been fired to its final condition. For example, it may be more practical to cut screw threads on the article or to drill holes therein after it is molded than to attempt to mold them into the article during the pressing step. For this purpose the relatively small amount of binder employed in the above-described method of dry pressing does not always impart sufficient green mechanical strength for machinability. The use of excessive amounts of binder, as mentioned above, causes difficulty in burning it out and, moreover, in the case of some binders, such as gelatin and cellulose nitrate or acetate which are resinous when dry, the molded article on drying may become too hard to machine. I have found that these difficulties can be overcome and the articles can be made machinable if, after being dry pressed as described above, they are given a preliminary firing which is sufficient to burn out the binder and cause an incipient fusion or coherence of the particles. The proper temperature and time for such preliminary firing can readily be determined by trial and preferably it should be carried out at about 50° to 100° C. below the softening temperature of the glass. Articles thus treated are mechanically strong yet are sufficiently friable that they can be drilled, tapped, etc. After being machined the articles are fired to their final non-friable glassy state.

From the foregoing it will be apparent that I have provided a method which permits the manufacture of impervious, wholly vitreous glass bodies which may include fine perforations, threads, flanges and grooves, accurate within close tolerances, which it has not heretofore been possible to produce from glass. By practicing my invention, I have made glass buttons, electric insulator bodies, filters for coffee makers and the like, packing members for reaction towers, rods, plates, tubing, dishes and many other shapes.

I claim:

1. The method of pressing powdered glass which comprises coating the particles of the powdered glass by moistening them with a solution containing cellulose nitrate in an amount not exceeding about 2% of the weight of the glass and an oxidizing agent, evaporating the solvent until the mixture is cohesive but not adhesive, shaping the dried product under pressure and firing the shaped article and oxidizing the cellulose nitrate.

2. The method of pressing powdered glass which comprises coating the particles of the powdered glass by moistening them with a solution containing biphenyl, evaporating the solvent until the mixture is cohesive but not adhesive, shaping the dried product under pressure and firing the shaped article and oxidizing the biphenyl.

3. The method of making an article from a powdered vitreous glass which comprises pulverizing the glass until at least about 50% of it will pass through a screen having 200 meshes to the lineal inch, adding thereto a solution containing an organic binder and an oxidizing agent in an amount not exceeding a total of about 10% of the weight of the glass and sufficient to dampen the glass powder and wet the individual particles thereof, evaporating the solvent until the mixture is substantially dry and cohesive under pressure but not adhesive, thereafter shaping it by pressure, and then firing the shaped article so as to oxidize and eliminate the binder and thereafter unite the individual particles of glass into an integral vitreous mass without change of shape.

4. The method of making an article from a powdered vitreous glass which comprises pulverizing the glass until at least about 50% of it will pass through a screen having 200 meshes to the lineal inch, adding thereto a solution containing an organic binder and an oxidizing agent in an amount not exceeding a total of about 10% of the weight of the glass and sufficient to dampen the glass powder and wet the individual particles thereof, drying the mixture until it contains about .25% to 1.5% of the solvent and is substantially dry and cohesive under pressure but not adhesive, thereafter shaping it by pressure, and then firing the shaped article so as to oxidize and eliminate the binder and thereafter unite the individual particles of glass into an integral vitreous mass without change of shape.

5. The method of making an article from a powdered vitreous glass which comprises pulverizing the glass until at least about 50% of it will pass through a screen having 200 meshes to the lineal inch, adding thereto a solution containing about .75 lb. of gelatin, about 1.5 lbs. of potassium nitrate and about 14 lbs. of water per 100 lbs. of powdered glass, drying the mixture until it contains about .25% to 1.5% of moisture, thereafter shaping it by pressure, and then firing the shaped article so as to oxidize and eliminate the binder and thereafter unite the individual particles of glass into an integral vitreous mass without change of shape.

6. The method of making an article from a powdered vitreous glass which comprises pulverizing the glass until at least about 50% of it will pass through a screen having 200 meshes to the lineal inch, adding thereto a solution containing an organic binder and an oxidizing agent in an amount not exceeding a total of about 10% of the weight of the glass and sufficient to dampen the glass powder and wet the individual particles thereof, evaporating the solvent until the mixture is substantially dry and cohesive under pressure but not adhesive, thereafter shaping it by pressure, firing the shaped article at a temperature and for a time sufficient to eliminate at least a major portion of the binder and cause incipient sintering and the acquisition of friability and machinability, subjecting the article to a final shaping operation and thereafter firing it so as to oxidize and eliminate any residual binder and convert the sintered article into an integral vitreous mass without change of shape.

CHARLES W. CLAPP.